US008294841B2

(12) United States Patent
Ho et al.

(10) Patent No.: US 8,294,841 B2
(45) Date of Patent: Oct. 23, 2012

(54) PIXEL ARRAY

(75) Inventors: Shiuan-Yi Ho, Hualien County (TW); Meng-Feng Hung, Taipei County (TW); Chien-Kuo He, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 450 days.

(21) Appl. No.: 12/613,524

(22) Filed: Nov. 5, 2009

(65) Prior Publication Data

US 2011/0051025 A1 Mar. 3, 2011

(30) Foreign Application Priority Data

Sep. 3, 2009 (TW) ............................... 98129733 A

(51) Int. Cl.
*G02F 1/1368* (2006.01)

(52) U.S. Cl. ........................................... 349/48; 349/38

(58) Field of Classification Search .................... 349/38, 349/39, 42, 48; 345/92, 93; 257/59, 72
See application file for complete search history.

(56) References Cited

U.S. PATENT DOCUMENTS

| | | | | |
|---|---|---|---|---|
| 2005/0030460 | A1 * | 2/2005 | Kim et al. | 349/139 |
| 2006/0268186 | A1 * | 11/2006 | Kamada et al. | 349/38 |
| 2009/0002583 | A1 * | 1/2009 | You et al. | 349/38 |
| 2010/0164851 | A1 * | 7/2010 | Wang et al. | 345/98 |

FOREIGN PATENT DOCUMENTS

| | | | |
|---|---|---|---|
| CN | 1800919 | | 7/2006 |
| CN | 101446722 | | 6/2009 |
| CN | 101776825 | | 7/2010 |
| JP | 2003-149664 | * | 5/2003 |

* cited by examiner

*Primary Examiner* — Dung Nguyen
*Assistant Examiner* — Tai Duong
(74) *Attorney, Agent, or Firm* — Jianq Chyun IP Office

(57) ABSTRACT

A pixel array includes many scan lines, data lines and pixel structures coupled to the scan lines and data lines. Each of the pixel structures includes a first pixel unit and a second pixel unit. Each of the first pixel units includes a first switch device. Each of the second pixel units includes a second switch device and a coupling capacitor. In each of the pixel structures in an $i^{th}$ row, a control end and a first end of the first switch device are respectively coupled to the $i^{th}$ scan line and one of the data lines; a control end and a first end of the second switch device are respectively coupled to the $(i-1)^{th}$ scan line and a second end of the first switch device. The coupling capacitor is coupled between the second end of the first switch device and a second end of the second switch device.

8 Claims, 4 Drawing Sheets

200

300

PIXEL ARRAY

CROSS-REFERENCE TO RELATED APPLICATION

This application claims the priority benefit of Taiwan application serial no. 98129733, filed on Sep. 3, 2009. The entirety of the above-mentioned patent application is hereby incorporated by reference herein and made a part of specification.

BACKGROUND OF THE INVENTION

1. Field of the Invention

The invention relates to a pixel array, and more particularly, to a pixel array which enhances display qualities of a display device.

2. Description of Related Art

In view of current display technologies, liquid crystal display panels, which have superior characteristics such as good space utilization, low power consumption, and being free of radiation, have gradually become the mainstream products in the market. In order to broaden the range of viewing angles of the liquid crystal display panels, a pixel array has been provided.

FIG. 1 shows an equivalent circuit diagram of a conventional pixel array. Referring to FIG. 1, a pixel array 100 includes a plurality of scan lines $GL_i$, $GL_{i+1}$, . . . , a plurality of data lines $DL_i$, $DL_{i+1}$, . . . , and a plurality of pixels structures PIX1, PIX2, PIX3, PIX4, . . . , wherein each of the pixel structures PIX1, PIX2, PIX3, PIX4, . . . includes a first pixel unit $P_M$ and a second pixel unit $P_S$. Each of the first pixel units $P_M$ includes a thin film transistor (TFT) T and a liquid crystal capacitor $C_{LC1}'$, and each of the second pixel units $P_S$ includes another liquid crystal capacitor $C_{LC2}'$ and a coupling capacitor $C_C'$.

In detail, through a gate end and a first source/drain end of each of the TFTs T, the pixel structure PIX1 is coupled to the scan line $GL_i$ and the data line $DL_i$, the pixel structure PIX2 is coupled to the scan line $GL_i$ and the data line $DL_{i+1}$. The pixel structure PIX3 is coupled to the scan line $GL_{i+1}$ and the data line $DL_i$, and the pixel structure PIX4 is coupled to the scan line $GL_{i+1}$ and the data line $DL_{i+1}$. Using the pixel structure PIX1 as an example, the liquid crystal capacitor $C_{LC1}'$ in the first pixel unit $P_M$ thereof is coupled between a second source/drain end of the TFT T and a common voltage $V_{com}$, and the liquid crystal capacitor $C_{LC2}'$ in the second pixel unit $P_S$ is coupled between the coupling capacitor $C_C'$ and the common voltage V. In practice, a storage capacitor $C_{st}$ is generally disposed between the second source/drain end of the TFT T and the common voltage $V_{com}$, so as to maintain the voltage level of the liquid crystal capacitor $C_{LC1}'$.

As know from the equivalent circuit diagram shown in FIG. 1, a relationship between a voltage $V_1$ and a voltage $V_2$ is as shown in the following equation.

$$V_2 = V_1 \frac{C'_C}{C'_{LC2} + C'_C}$$

A voltage difference between the first pixel unit $P_M$ and the second pixel unit $P_S$ when they are displaying is shown as the difference between the two voltages $V_1$ and $V_2$ in the above equation. Through the first and second pixel units $P_M$ and $P_S$ having different voltage values when displaying, the respective liquid crystal molecules in the first and second pixel units $P_M$ and $P_S$ have different tilting angles, thereby broadening the range of viewing angles of the liquid crystal display panel.

However, the coupling capacitor $C_C'$ is disposed in the second pixel unit $P_S$ in a floating method. This design causes residual charges in the coupling capacitor $C_C'$, thereby causing residual images on the displayed frame and lowering the display qualities.

SUMMARY OF THE INVENTION

The invention provides a pixel array which enhances display qualities of the display panel.

The invention provides a pixel array which includes a plurality of scan lines, a plurality of data lines and a plurality of pixel structures coupled to the scan lines and the data lines, wherein each of the pixel structures includes a first pixel unit and a second pixel unit. Each of the first pixel units includes a first switch device, and each of the second pixel units includes a second switch device and a coupling capacitor. In each of the pixel structures in an $i^{th}$ row of the pixel structures, a control end and a first end of the first switch device are respectively coupled to the $i^{th}$ scan line and one of the data lines, and a control end and a first end of the second switch device are respectively coupled to the $(i-1)^{th}$ scan line and a second end of the first switch device. Besides, the coupling capacitor is coupled between the second end of the first switch device and a second end of the second switch device.

According to an embodiment of the invention, when the $(i-1)^{th}$ scan line is enabled, the charges in the coupling capacitor in each of the pixel structures in the $i^{th}$ row is cleared.

According to an embodiment of the invention, each of the second pixel units further includes a third switch device. In the second pixel unit in each of the pixel structures in the $i^{th}$ row, a control end of the third switch device is coupled to the $(i-1)^{th}$ scan line, a first end of the third switch device is coupled to the succeeding data line, and a second end of the third switch device is coupled to the second end of the first switch device.

According to an embodiment of the invention, each of the first pixel units further includes a liquid crystal capacitor, wherein the liquid crystal capacitor is coupled, in series, between the second end of the first switch device and a common voltage. According to an embodiment, each of the first pixel units further includes a storage capacitor, wherein the storage capacitor is coupled, in series, between the second end of the first switch device and the common voltage.

According to an embodiment of the invention, each of the second pixel units further includes another liquid crystal capacitor, wherein the other liquid crystal capacitor is coupled, in series, between the second end of the second switch device and the common voltage. According to an embodiment, each of the second pixel units further includes another storage capacitor, wherein the other storage capacitor is coupled, in series, between the second end of the second switch device and the common voltage.

According to an embodiment of the invention, each of the first switch devices and the second switch devices is a TFT.

According to an embodiment of the invention, each of the third switch devices is a TFT.

In light of the above, through the skillful disposition of each element in the first and second pixel units, the pixel array of the invention not only improves display errors such as residual images, but also further enhances display qualities.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The following provides examples for illustrating the pixel array according to the present embodiment, but the invention is not limited to the only the following implementations.

First Embodiment

Figure 1:
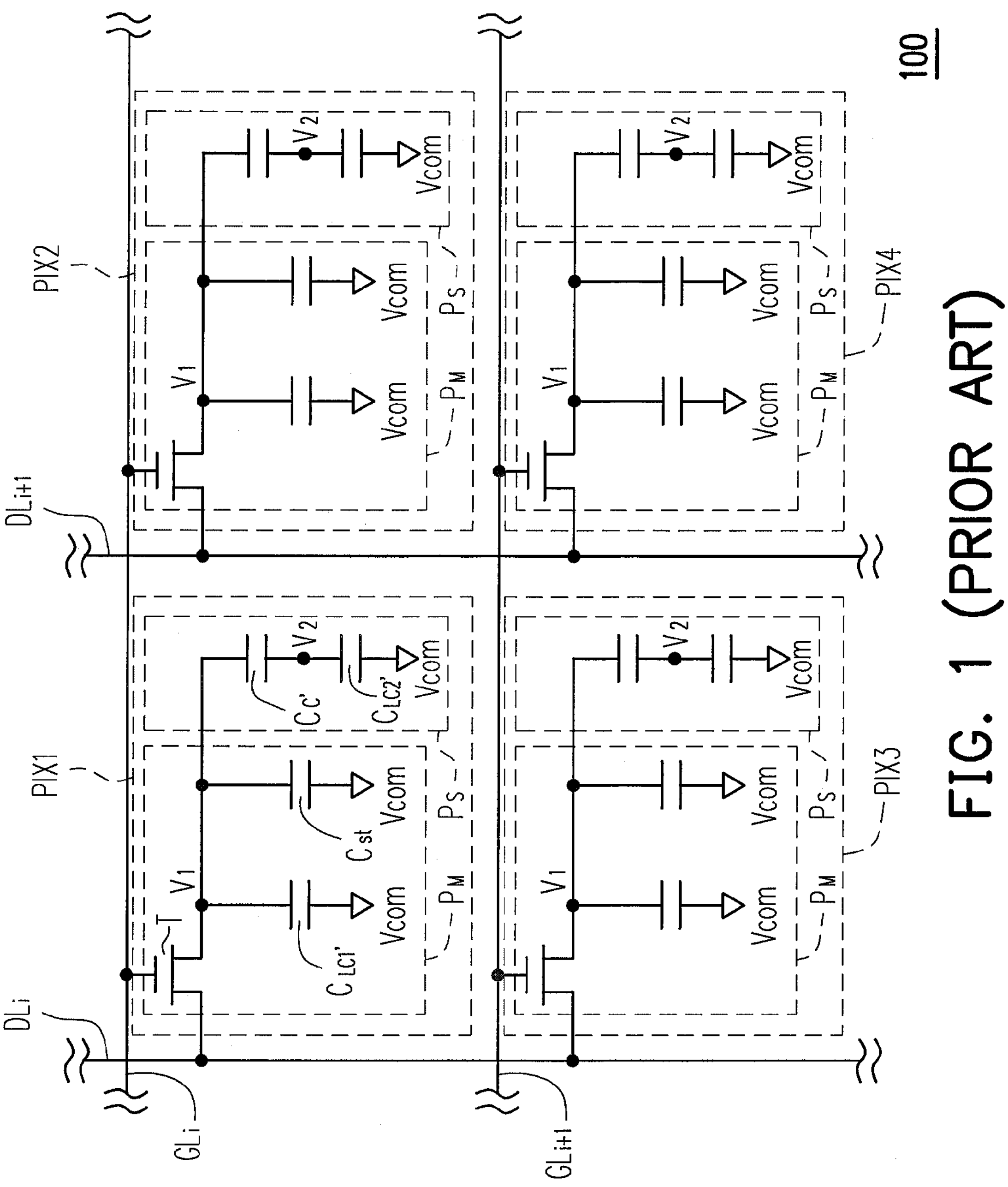
FIG. 1 (PRIOR ART)
FIG. 1 shows an equivalent circuit diagram of a conventional pixel array.
Figure 2A:
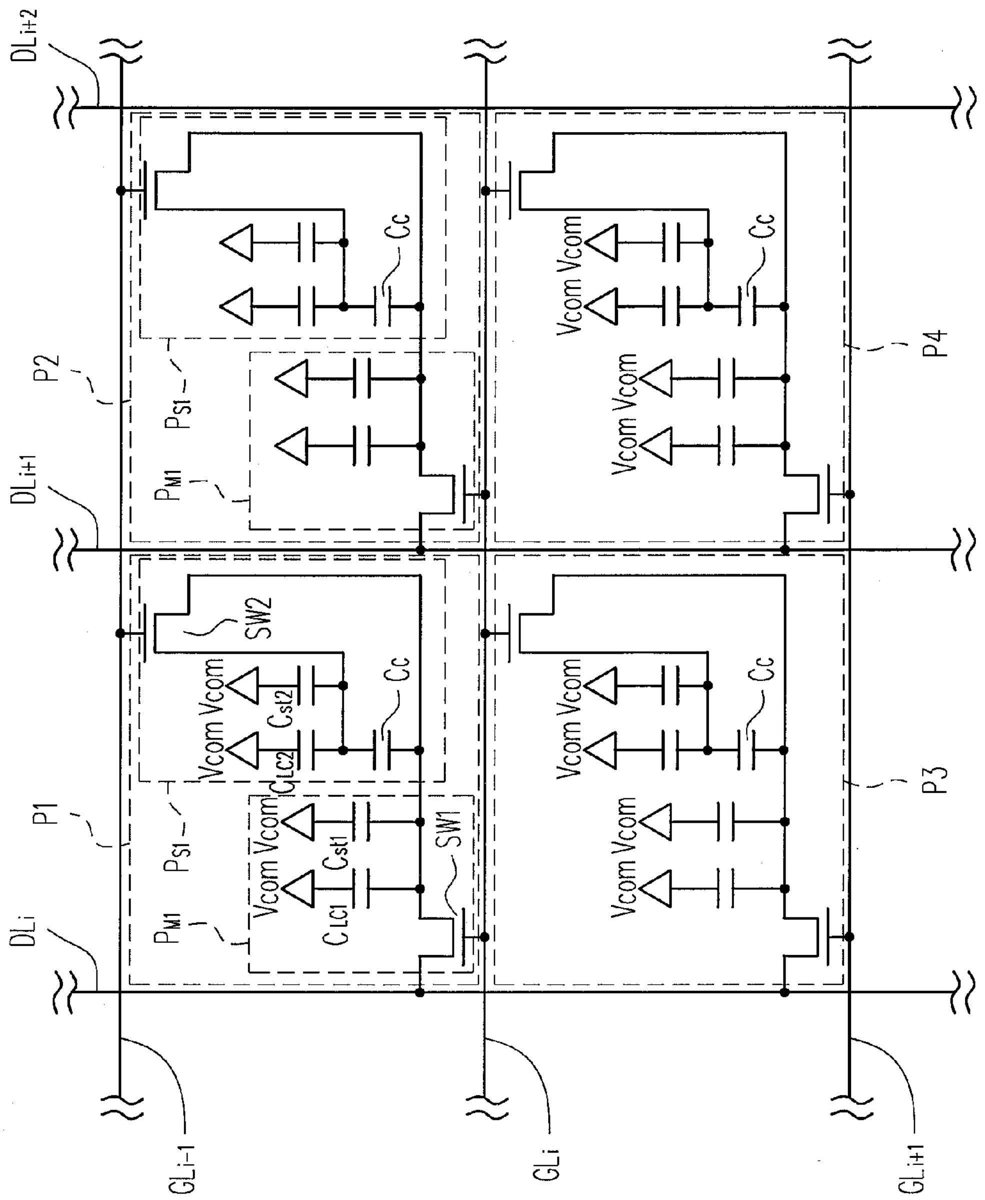
FIG. 2A shows an equivalent circuit diagram of a pixel array according to the first embodiment of the invention.

FIG. 2A shows an equivalent circuit diagram of a pixel array according to the first embodiment of the invention. Referring to FIG. 2A, a pixel array 200 includes a plurality of scan lines $GL_{i+1}$, $GL_i$, $GL_{i+1}$, . . . , a plurality of data lines $DL_i$, $DL_{i+1}$, $DL_{i+2}$, . . . , and a plurality of pixels structures P1, P2, P3, P4.

For convenience of illustration, FIG. 2A only shows three scan lines $GL_{i-1}$, $GL_i$, and $GL_{i+1}$, three data lines $DL_i$, $DL_{i+1}$, and $DL_{i+2}$, and four pixel structures P1, P2, P3 and P4, but the invention is not limited to the structure of this equivalent circuit. Persons having ordinary skills in the art should be able to deduce the coupling relationships between the other scan lines, data lines and pixel structures. The following mainly illustrates the elements shown in FIG. 2A.

According to the present embodiment, the pixel structure P1 is coupled to the scan lines $GL_{i+1}$ and $GL_i$ and is coupled to the data line $DL_i$. The pixel structure P2 is coupled to the scan lines $GL_{i-1}$ and GL, and is coupled to the data line $DL_{i+1}$. The pixel structure P3 is coupled to the scan lines $GL_i$ and $GL_{i+1}$ and is coupled to the data line $DL_i$. The pixel structure P4 is coupled to the scan lines $GL_i$ and $GL_{i+1}$ and is coupled to the data line $DL_{i+1}$.

In detail, each of the pixel structures P1, P2, P3 and P4 according to the present embodiment includes a first pixel unit $P_{M1}$ and a second pixel unit $P_{S1}$, wherein each of the first pixel units $P_{M1}$ includes a first switch device SW1, and each of the second pixel units $P_{S1}$ includes a second switch device SW2 and a coupling capacitor $C_C$. Using the pixel structure P1 as an example, a control end and a first end of the first switch device SW1 are respectively coupled to the scan line GL, and the data line $DL_i$, and a control end and a first end of the second switch device SW2 are respectively coupled to the scan line (which is the scan line $GL_{i-1}$) preceding the scan line GL, and the second end of the first switch device SW1. The coupling capacitor $C_C$ is coupled between the second end of the first switch device SW1 and the second end of the second switch device SW2. However, the relationships according to which the elements are disposed in the other pixel structures P2, P3 and P4 may be referred to those in the above description about the pixel structure P1 and are not repeated described.

According to the present embodiment, the pixel array 200 is capable of being applied to a liquid crystal display panel, so that each of the first pixel units $P_{M1}$ further includes a liquid crystal capacitor $C_{LC1}$, wherein the liquid crystal capacitor $C_{LC1}$ is coupled, in series, between the second end of the first switch device SW1 and a common voltage $V_{com}$. In practice, in each of the first pixel units $P_{M1}$, a storage capacitor $C_{st1}$ may be coupled, in series, between the second end of the first switch device SW1 and the common voltage $V_{com}$, so as to maintain the potential of the liquid crystal capacitor $C_{LC1}$, thereby enhancing the overall display quality of the liquid crystal display panel.

On the other hand, each of the second pixel units $P_{S1}$ further includes another liquid crystal capacitor $C_{LC2}$, wherein the liquid crystal capacitor $C_{LC2}$ is coupled, in series, between the second end of the second switch device SW2 and the common voltage $V_{com}$. Equally, in application of actual products, in each of the second pixel units $P_{S1}$, another storage capacitor $C_{st2}$ may be coupled, in series, between the second end of the second switch device SW2 and the common voltage $V_{com}$, so as to maintain the potential of the liquid crystal capacitor $C_{LC1}$.

According to the present embodiment, when the scan line $GL_{i-1}$ is enabled whereas the other scan lines $GL_i$, $GL_{i+1}$, . . . are disabled, the second switch devices SW2 in the pixel structures in the same row (which is called the first row in the following) as the pixel structures P1 and P2 are turned on. At this moment, in the first row, the turning on of the second switch devices not only discharges the coupling capacitors $C_c$, thereby clearing the charges in the coupling capacitors $C_C$, but also charges the liquid crystal capacitors $C_{LC1}$.

Figure 2B:
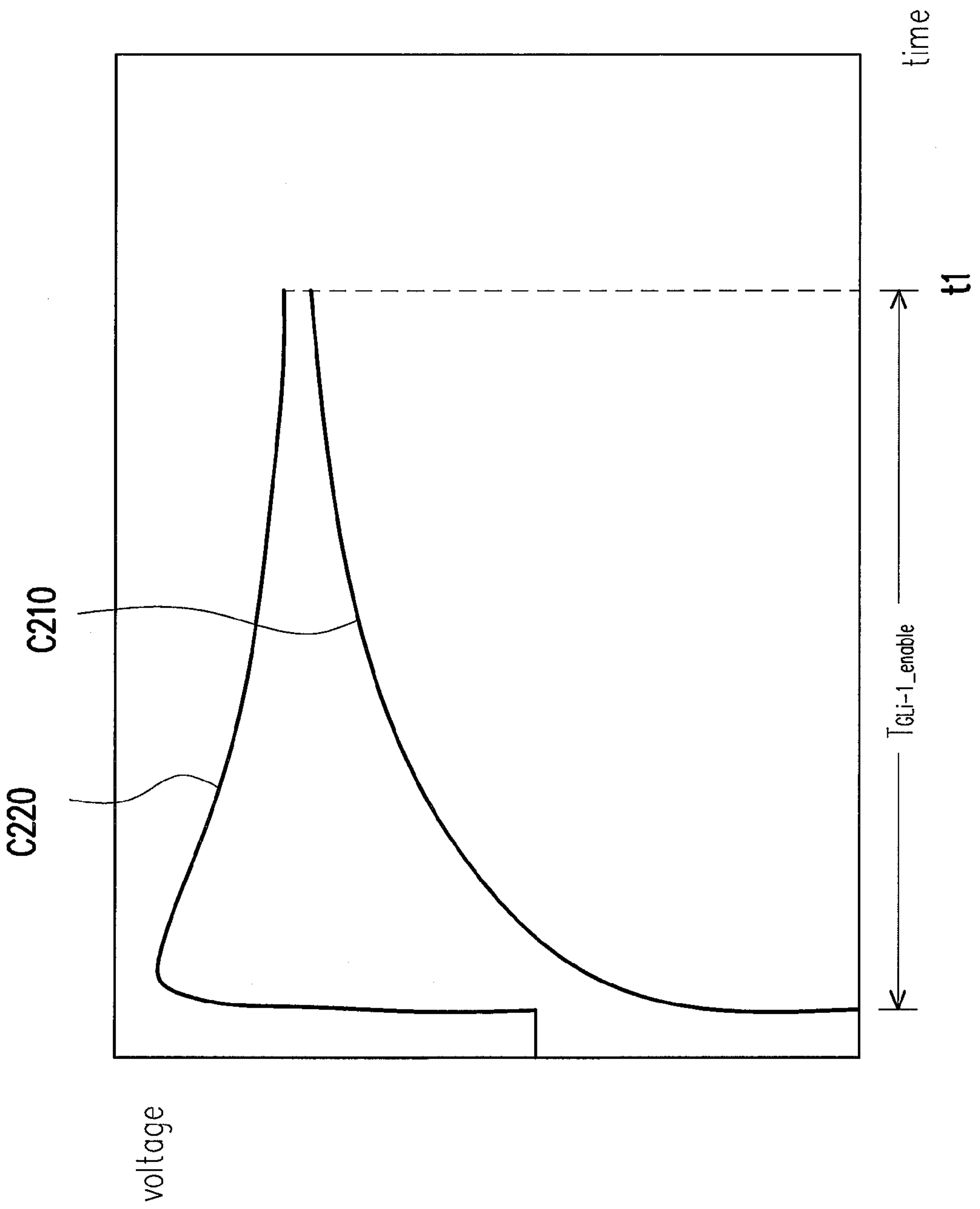
FIG. 2B shows a waveform according to the first embodiment of the invention.

In detail, in the waveform shown in FIG. 2B, the X-coordinate and the Y-coordinate respectively represent time and voltage, and the curve C210 and the curve C220 respectively represent the relationships between voltages and times in the first pixel units $P_{M1}$ and in the second pixel units $P_{S1}$. As known from FIG. 2B, during the period $T_{GLi-1\_enable}$ in which the scan line $GL_{i-1}$ is enabled, the voltage of the first pixel units $P_{M1}$ in the first row increases with time, meaning that the first pixel units $P_{M1}$ in the first row are charged during the period $T_{GLi-1\_enable}$. On the other hand, the voltage of the second pixel units $P_{S1}$ in the first row decreases with time, meaning that the second pixel units $P_{S1}$ in the first row are discharged during the period $T_{GLi-1\_enable}$. Equally, the electrical relationships between the first pixel units $P_{M1}$ and the second pixel units $P_{S1}$ in the other rows may be deduced.

Still referring to FIG. 2B, according to the present embodiment, the scan line $GL_{i-1}$ ceases to be enabled at a time t1. In the meantime, the voltage difference between the first pixel units $P_{M1}$ and the second pixel units $P_{S1}$ is only 0.02 volts (V), meaning that the charges in the coupling capacitor $C_C$ are substantially cleared, so that the second pixel unit $P_{S1}$ after being discharged and the first pixel unit $P_{M1}$ after being charged have voltages that are close to each other.

Next, the scan line $GL_{i-1}$ ceases to be enabled, and the scan line $GL_i$ is enabled whereas the other scan lines $GL_{i-1}$, $GL_{i+1}$, . . . are disabled. In the meantime, in the pixel structures P1, P2, . . . , in the first row, the first switch devices SW1 are turned on, so that the first pixel units $P_{M1}$ and the second pixel units $P_{S1}$ are able to receive a data voltage on the data line DL, through the first switch devices SW1 which are turned on. It should be noted that, since the pixel units $P_{M1}$ are pre-charged to a certain voltage level during the preceding period in which the scan line $GL_{i-1}$ is enabled, the time required for the first pixel units $P_{M1}$ to reach the target voltage level at this moment is shortened, thereby shortening the reaction time of the liquid crystal display panel.

It should be noted that, according to the present embodiment, each of the first switch devices SW1 and the second switch devices SW2 is individually a TFT. The control end of each of the two kinds of switch devices is a gate of the TFT, the first end is, for example, a first source/drain, and the second end is, for example, a second source/drain. According to a preferable embodiment, when a ratio of a width to length (W/L ratio) of a channel of each of the second switch devices SW2 formed by the TFT is about 10/3.5 to 5.5/10, the display panel has superb display qualities.

Second Embodiment

The spirit of the present embodiment is similar to that described in the first embodiment, wherein the main difference between the present embodiment and the first embodiment is that in each of the pixel structures of the pixel array according to the present embodiment, still another switch device is further disposed (illustrated in detail in the following). However, reference numbers in the present embodiment which are the same as or similar to those in the previous embodiment represent the same or similar elements. Accordingly, no further description thereof is provided hereinafter.

Figure 3:
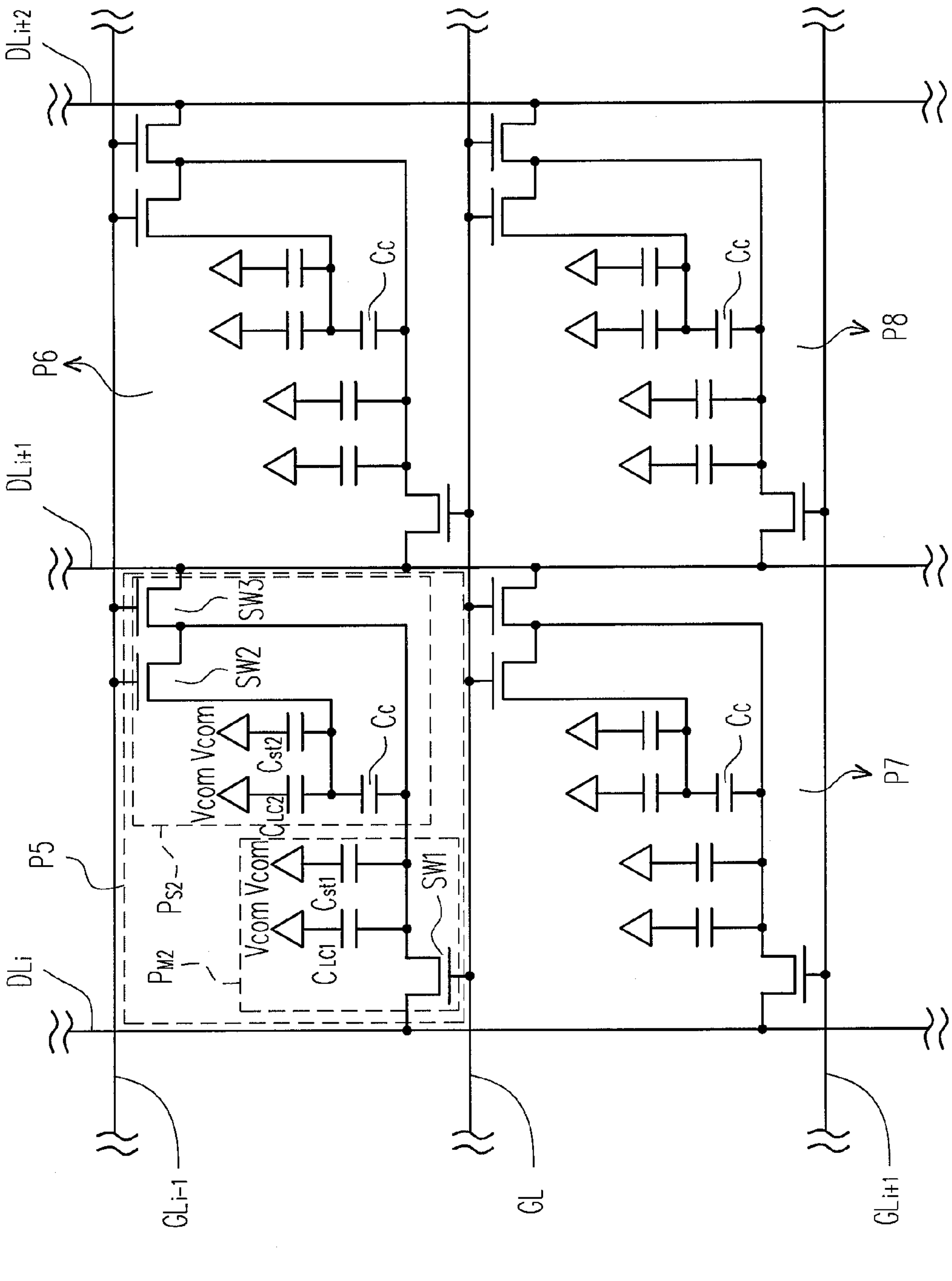
FIG. 3 shows an equivalent circuit diagram of a pixel array according to the second embodiment of the invention.

FIG. 3 shows an equivalent circuit diagram of a pixel array according to the second embodiment of the invention. Referring to FIG. 3, a pixel array 300 includes a plurality of scan lines $GL_{i-1}$, $GL_i$, $GL_{i+1}$, . . . , a plurality of data lines $DL_i$, $DL_{i+1}$, $DL_{i+2}$, . . . , and a plurality of pixels structures P5, P6, P7, P8, wherein the coupling relationships between the scan lines $GL_{i-1}$, $GL_i$, $GL_{i+1}$, the data lines $D_i$, $DL_{i+1}$, $DL_{i+2}$, . . . , and the pixels structures P5, P6, P7, P8 may be referred to those in the first embodiment and are not illustrated in detail here. In addition, the following mainly illustrates the elements shown in FIG. 3.

According to the present embodiment, each of the pixel structures P5, P6, P7, P8 includes a first pixel unit $P_{M2}$ and a second pixel unit $P_{S2}$, wherein each of the first pixel units $P_{M2}$ includes a first switch device SW1, and each of the second pixel units $P_{S2}$ includes a second switch device SW2, a third switch device SW3 and a coupling capacitor $C_C$. When the pixel array 300 according to the present embodiment is applied to a liquid crystal display panel, each of the first pixel units $P_{M2}$ and each of the second pixel units $P_{S2}$ may respectively include a liquid crystal capacitor $C_{LC1}$ and a liquid crystal capacitor $C_{LC2}$, wherein in applications in actual products, a storage capacitor $C_{st1}$ and a storage capacitor $C_{st2}$ may be further disposed respectively in each of the first pixel units P and each of the second pixel units $P_{S2}$.

According to the present embodiment, the coupling relationships between the first switch devices SW1, the second switch devices SW2, the coupling capacitors $C_c$ and the other elements may be referred to those in the first embodiment and are not repeated described. However, regarding the second pixel units $P_{S2}$ according to the present embodiment and using the pixel structure P5 as an example, a control end and a first end of the third switch device SW3 are respectively coupled to the scan line (which is the scan line $GL_{i-1}$) preceding the scan line $GL_i$ and the data line (which is the data line $DL_{i+1}$) succeeding the data line $DL_i$, and a second end of the third switch device SW3 is coupled to a first end of the second switch device SW2 and a second end of the first switch device SW1.

According to the present embodiment, when the scan line $GL_{i-1}$ is enabled whereas the other scan lines $GL_i$, $GL_{i+1}$, . . . , are disabled, the second switch devices SW2 in the pixel structures in the same row (which is called the first row in the following) as the pixel structures P5 and P6 are turned on, and the second pixel units $P_{S2}$ are capable of receiving a data voltage on the data line $DL_{i+1}$ through the second switch devices SW2. At this moment, in the pixel structures P5, P6, . . . in the first row, the turning on of the second switch devices not only charges the liquid crystal capacitors $C_{LC1}$ and $C_{LC1}$, but also discharges the coupling capacitors $C_C$, thereby clearing the charges in the coupling capacitors $C_C$.

Next, the scan line $GL_{i-1}$ ceases to be enabled, and the scan line $GL_i$ is enabled whereas the other scan lines $GL_{i-1}$, $GL_{i+1}$, . . . , are disabled. In the meantime, in the pixel structures P5, P6, . . . , in the first row, the first switch devices SW1 are turned on, so that the first pixel units $P_{M2}$ and the second pixel units $P_{S2}$ are able to receive a data voltage on the data line $DL_i$ through the first switch devices SW1 which are turned on.

Accordingly, since the first and second pixel units $P_{M2}$ and $P_{S2}$ in the first row are pre-charged to a certain voltage level during the preceding period in which the scan line $GL_{i-1}$ enabled, according to the present embodiment, the times required for charging the first pixel units $P_{M2}$ and the second pixel units $P_{S2}$ during the period in which the scan line $GL_i$ is enabled are shortened, thereby shortening the reaction time of the liquid crystal display panel.

According to the present embodiment, each of the first switch devices SW1, the second switch devices SW2 and the third switch devices SW3 is individually a TFT, wherein the control end of each of the three kinds of switch devices is a gate of the TFT, and the first end and the second end are respectively a first source/drain and a second source/drain. According to a preferable embodiment, when a W/L ratio of a channel of each of the third switch devices SW3 is about 10/3.5, adopting a design in which a W/L ratio of the second switch device is less than 5.5/15 enables the display panel to have superb display qualities.

In summary, in the pixel array of the invention, through the special layout between the switch devices and the coupling capacitor in each of the pixel structures, the charges in the coupling capacitors are able to be cleared, thereby solving the long existing problems of charge accumulation and display errors derived therefrom in conventional pixel arrays. Moreover, when the pixel array of the invention is applied to the display panel, the time required for charging each of the pixel structures is shortened, thereby shortening reactions speeds of the display panel. In summary, the pixel array of the invention enhances display qualities of the display panel.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pixel array, comprising a plurality of scan lines, a plurality of data lines and a plurality of pixel structures coupled to the scan lines and the data lines, wherein each of the pixel structures in an $i^{th}$ row of the pixel structures comprises:

a first pixel unit, comprising:

a first switch device, wherein a control end of the first switch device is coupled to an $i^{th}$ scan line, and a first end of the first switch device is coupled to one of the data lines; and a second pixel unit, comprising:

a second switch device, wherein a control end of the second switch device is coupled to an $(i-1)^{th}$ scan line, and a first end of the second switch device is coupled to a second end of the first switch device; and a coupling capacitor, coupled between the second end of the first switch device and a second end of the second switch device, wherein the second pixel unit of each of the pixel structures in the $i^{th}$ row further comprising:

a third switch device, wherein a control end of the third switch device is coupled to the $(i-1)^{th}$ scan line, a first end of the third switch device is coupled to a succeeding data line, and a second end of the third switch device is coupled to the second end of the first switch device.

2. The pixel array of claim 1, wherein when the $(i-1)^{th}$ scan line is enabled, charges in the coupling capacitor in each of the pixel structures in the $i^{th}$ row is cleared.

3. The pixel array of claim 1, each of the first pixel units further comprising:

a liquid crystal capacitor, coupled in series between the second end of the first switch device and a common voltage.

4. The pixel array of claim 3, each of the first pixel units further comprising:

a storage capacitor, coupled in series between the second end of the first switch device and the common voltage.

5. The pixel array of claim 1, each of the second pixel units further comprising:

a liquid crystal capacitor, coupled in series between the second end of the second switch device and a common voltage.

6. The pixel array of claim 5, each of the second pixel units further comprising:

a storage capacitor, coupled in series between the second end of the second switch device and the common voltage.

7. The pixel array of claim 1, wherein each of the first switch devices and the second switch devices is a thin film transistor.

8. The pixel array of claim 1, wherein each of the third switch devices is a thin film transistor.

* * * * *